United States Patent [19]

Probst et al.

[11] 4,412,941

[45] Nov. 1, 1983

[54] RECORDING DISC COMPOSITIONS COMPRISING POLYMERS OF MONOVINYL-SUBSTITUTED HYDROCARBONS, CONDUCTIVE CARBON BLACK AND LUBRICANTS

[75] Inventors: Nicolas J. Probst, Brussels; Jean Iker, Overijse; Jacques Autin, Brussels, all of Belgium

[73] Assignee: Phillips Petroleum Company, Bartlesville, Okla.

[21] Appl. No.: 313,928

[22] Filed: Oct. 22, 1981

[51] Int. Cl.$^3$ .............................................. C08K 3/04
[52] U.S. Cl. ............................... 252/511; 260/998.16; 358/342; 523/174; 524/496
[58] Field of Search ...................... 252/511; 260/42.47, 260/23.7 M, 29.1 SB, 998.16; 358/128.5, 129; 524/495, 496; 523/174

[56] References Cited

U.S. PATENT DOCUMENTS

| | | |
|---|---|---|
| 818,279 | 7/1877 | Fox et al. |
| 2,750,349 | 6/1956 | O'Herren |
| 3,135,379 | 6/1964 | Nandain |
| 3,639,517 | 2/1972 | Kitchen et al. |
| 3,639,521 | 2/1972 | Hsieh |
| 3,849,345 | 11/1974 | Snavely ............................ 260/42.27 |
| 3,960,790 | 6/1976 | Khanna |
| 4,035,336 | 7/1977 | Jordan .............................. 260/42.27 |
| 4,076,652 | 2/1978 | Ganci .................................. 252/511 |
| 4,091,053 | 5/1978 | Kitchen |
| 4,129,536 | 12/1978 | Martin et al. |
| 4,151,132 | 4/1979 | Khanna |
| 4,228,050 | 10/1980 | Martin et al. |
| 4,304,881 | 12/1981 | Aoki ................................ 260/42.27 |

*Primary Examiner*—Paul R. Michl

[57] ABSTRACT

Electrically-conductive compositions comprising about 65–85 weight percent of a resin component based on conjugated alkadienes having 4 to 8 carbon atoms and monovinyl-substituted arenes having 8 to 12 carbon atoms, with 10–30 weight percent extra-conductive carbon black, and about 1 to 5 weight percent of at least one lubricant can be molded into video discs without the processing problems encountered with compositions comprising polyvinyl chloride.

57 Claims, No Drawings

RECORDING DISC COMPOSITIONS COMPRISING POLYMERS OF MONOVINYL-SUBSTITUTED HYDROCARBONS, CONDUCTIVE CARBON BLACK AND LUBRICANTS

This invention relates to a novel molding composition; more particularly, this invention relates to a conductive molding composition for producing video recording discs of superior qualities.

BACKGROUND OF THE INVENTION

Conductive molding compositions suitable for molding video discs used in a capacitance pickup video playback system are disclosed in U.S. Pat. Nos. 4,151,132 and 4,228,050. Such compositions comprise vinyl chloride homopolymers (PVC) and copolymers containing stabilizers, lubricants and processing aids as well as conductive carbon black particles. Due to the heat generated by the high shear and mixing time required for dispersion of the ingredients, particularly the carbon black particles, in such compositions, excessive temperatures can occur which can lead to decomposition of the PVC and generation of volatiles as well as staining and excessive bleedout of additives in finished discs of such compositions. Other disadvantages of such PVC compositions are disclosed in the above references. Some of these problems were alleviated by a composition disclosed in U.S. Pat. No. 4,151,132 comprising conductive carbon black particles in a vinyl chloride copolymer with additives comprising four or more plasticizers and processing aids, two or more metal stabilizers and a mixture of at least three lubricants.

SUMMARY OF THE INVENTION

An object of this invention is to obtain conductive molding compositions which provide good processability and thermal stability in the processing of said compositions and molding of video discs therefrom.

Another object of this invention is to provide molding compositions having suitable characteristics for video disc moldings, using simpler combinations of ingredients.

In accordance with this invention we have prepared conductive molding compositions having a bulk resistivity below about 500 ohm-cm at 900 megaHertz (equivalent to about 3 ohm-cm for direct current) which are readily processable, have relatively high heat distortion temperatures, and can be molded into video disc replicas having good dimensional stability up to about 160 degrees Fahrenheit (70 degrees Centigrade) with improved homogeneity and surface characteristics. Although the low resistivity of discs molded from the inventive compositions make them most suitable for video discs, they can also be used for the playback of audio or other information.

In accordance with a first embodiment of this invention a molding composition is provided. This molding composition comprises:

(a) a resin component selected from the group consisting of
  (1) a normally solid, resinous copolymer of a major amount of monovinyl-substituted aromatic hydrocarbon (arene) containing from 8 to 12 carbon atoms per molecule and a minor amount of at least one conjugated alkadiene containing from 4 to 8 carbon atoms per molecule, with said copolymer preferably comprising about 70–80 weight percent of units derived from said monovinyl aromatic hydrocarbon and about 30–20 weight percent of units derived from said conjugated alkadiene, and optional modifying polymers comprising one or more of
    (A) a normally solid resinous homopolymer of a monovinyl-substituted aromatic hydrocarbon, and
    (B) a normally solid elastomeric copolymer of a major amount of at least one conjugated alkadiene containing from 4 to 8 carbon atoms per molecule and a minor amount of a monovinyl-substituted aromatic hydrocarbon containing from 8 to 12 carbon atoms per molecule, preferably comprising from about 60 to 90 weight percent of units derived from said conjugated alkadiene and from about 40 to 10 weight percent of units derived from said monovinyl aromatic hydrocarbon, which copolymer can be random or block (diblock and radial) in nature,
  (2) a normally solid, resinous homopolymer of a monovinyl-substituted aromatic hydrocarbon and one or more modifying polymer selected from the group consisting of
    (A) said elastomeric copolymer, and
    (B) said resinous copolymer referred to above.
(b) particles of extra-conductive carbon black, having preferred properties as described below,
(c) one or more lubricants, preferably selected from the group consisting of silicone oils and alkyl esters of fatty acids, with all said components uniformly dispersed in the resulting composition.

Additives comprising components to increase the surface hardness of the molding composition can be used.

More narrowly, and preferably, said resinous copolymer comprises block copolymers, preferably block copolymers of styrene and 1,3-butadiene wherein said styrene content ranges from about 70 to 80 weight percent; most preferably, radial block copolymers are used.

In accordance with a second embodiment of this invention, video discs molded of the inventive composition are provided. Said video discs are adapted for use with a playback stylus to effect recovery of signals occupying a band width of at least several megaHertz when relative motion at a desired rate is established between said disc and said stylus, said disc having information stored, and said information being recoverable in the form of signals of said band width upon establishment of said motion at said rate. In accordance with this invention the video discs are molded from the composition defined.

In surprising contrast to the difficulties of processing molding compositions based upon PVC resins, the compositions of this invention are easily processed and have a relatively high thermal decomposition temperature without the addition of extra stabilizers, multiple lubricants, or processing aids. Video discs molded of such compositions are approximately 20 percent lighter than those of PVC-based compositions, exhibit no polarization problems as occur with degraded PVC, and display improved homogeneity, surface finish and flexibility. Dimensional stability of said discs is excellent. Furthermore, using the preferred form of extra-conductive carbon black, the required maximum level of resistivity is attained at a lower degree of carbon black loading than is disclosed in the prior art for conductive compounds comprising polyvinyl chloride. Additionally, said preferred carbon black can be more completely dispersed in the composition, and contains less metallic and/or magnetic "grit", thus produces discs of more uniform conductivity and surface characteristics.

DETAILED DESCRIPTION OF THE INVENTION

Compositions suitable for molding video discs must have a uniform dispersion of conductive particles and any other additives in the base resin so that the molded article will have a uniform surface free of defects, and exhibit minimum shrinkage and warp characteristics. The composition must be readily processable to form a very detailed and intricate relief pattern over the surface of a recording disc of about 8 inches to 14 inches diameter; normally, sufficient additives must be added to overcome the stiffness and brittleness imparted by the large quantity of conductive particles present. With PVC-based compositions, such additives cause problems such as are disclosed in U.S. Pat. No. 4,228,050, column 2, line 65 following. In addition, such discs should be relatively insensitive to the changes in temperature and humidity that may be encountered during storage, shipping and use. The compositions disclosed herein achieve the desired qualities and meet the necessary specifications without extensive additives being required.

The preferred compositions of this invention comprise extra-conductive carbon black and lubricants uniformly dispersed in a resin component, which comprises a major proportion of the resinous copolymers of monovinyl-substituted aromatic hydrocarbons and conjugated alkadienes previously described and a minor proportion of optional modifying polymers comprising resinous homopolymers of monovinyl-substituted aromatic hydrocarbons and elastomeric copolymers of monovinyl-substituted aromatic hydrocarbons with conjugated alkadienes, as previously described; alternatively, said resin component can comprise a major proportion of said homopolymer of monovinyl-substituted aromatic hydrocarbons with minor proportions of modifying polymers comprising said resinous copolymers and/or said elastomeric copolymers.

Broadly, said compositions can comprise said resin component in proportions ranging from about 65 to 85 weight percent of said composition, carbon black in proportions ranging from about 10 to 30 weight percent, and lubricant in proportions ranging from 1 to 5 weight percent. Said resin component can comprise said resinous copolymer in proportions ranging from about 60 to 100 weight percent, with the balance of 40 to 0 weight percent of said resin component consisting of said elastomeric copolymers and/or said resinous homopolymers, in proportions chosen to produce the desired properties for said composition. When the elastomeric copolymer alone is added, it can comprise up to about 15 weight percent of said total composition; if the resinous homopolymer is also added, the content of elastomeric copolymer can be increased up to about 20 weight percent of said total composition, with said resinous homopolymer comprising up to about 25 weight percent of the total composition.

Alternatively, said resinous homopolymer can comprise from about 40 to about 60 weight percent of said resin component, with the remaining 60 to 40 weight percent comprising said resinous copolymer and/or said elastomeric copolymer.

RESINOUS POLYMERS

Polymers suitable for use in the resin components of these compositions comprise:

(a) a normally solid, resinous copolymer, consisting essentially of a major amount of units derived from one or more monovinyl-substituted aromatic hydrocarbons containing from 8 to 12 carbon atoms per molecule and a minor amount of units derived from one or more conjugated alkadiene containing from 4 to 8 carbon atoms per molecule, and (b) a normally solid, resinous homopolymer of said vinyl aromatic hydrocarbon, preferably polystyrene.

Said resins comprise copolymers, terpolymers, etc. which more specifically can be block polymers. Preferably, block copolymers of styrene and 1,3-butadiene are used, wherein the styrene content ranges from about 70 to 80 weight percent, most preferably, radial block copolymers are used which have a central unit (generally derived from a polyfunctional coupling agent) and a plurality of polymer chains extending therefrom; the free ends of the polymer chain are composed essentially of poly(vinyl aromatic) blocks.

Resins presently preferred comprise Phillips Petroleum Company K-Resins ®, as described in Example I below.

ELASTOMERIC ALKADIENE COPOLYMERS

To provide optimum flexibility and toughness to said discs, the preferred resin components of this invention can optionally include as a modifying polymer an elastomeric copolymer of a monovinyl-substituted aromatic hydrocarbon of 8 to 12 carbon atoms per molecule with an alkadiene of 4 to 8 carbons per molecule, preferably comprising from about 10 to 40 weight percent units derived from styrene and from about 90 to 60 weight percent units derived from 1,3-butadiene; said elastomeric copolymer must be miscible and compatible with the base resin used. Said elastomeric copolymers can be random or block (diblock or radial) in nature. By the addition of relatively small amounts of said elastomeric copolymers to said base resin, a plastic modification is achieved which improves overall properties of the compound comprising flexibility and toughness.

Resin components based on homopolymers of said monovinyl aromatic hydrocarbons, such as polystyrene, must include one or more modifying polymers selected from the group comprising said elastomeric copolymers and said resinous copolymers.

CARBON BLACK

Conductive particles suitable for use in the molding composition of this invention include highly electrically conductive, finely divided carbon blacks, preferably with a low bulk density to reduce loading requirements (For loose black, about 80 to 112 kilograms per cubic meter constitutes a preferable range for such bulk density.). The black can be characterized by one or more of the following ranges of parameters.

(a) Nitrogen BET surface area, 600 to 1200 square meters per gram (ASTM D-3037).

(b) DBP absorption (dibutylphthalate) pore volume, 300 to 450 milliliters per 100 grams (ASTM D-2414).

(c) Pelleted pour density (ASTM D-1513) of less than 250 kilograms per cubic meter.

(d) Average particle size of less than 500 Angstroms.

(e) When dispersed in the inventive molding compositions in proportions of up to 30 weight percent, a bulk resistivity of less than about 500 ohm-cm at 900 megaHertz, or about 3 ohm-cm under direct current (D.C.) is obtained. While compositions with this resistivity are operable, preferably compositions of resistivities less than 100 ohm-cm at 900 megaHertz or 1 ohm-cm (D.C.) can be prepared and employed in the molding of discs.

Presently preferred is the extra-conductive carbon black marketed as XE-2 by the Phillips Petroleum Company. This black, made, for example, from a heavy oil gasification reaction along with carbon monoxide and hydrogen, has a large surface area, a very large pore volume, and low grit content. In preparing the inventive compositions, it was found that this black produced lower resistivity values at similar loading levels in weight percent, compared with prior art compositions using PVC resins and other available blacks. Furthermore, due to its physical properties and purity, this preferred carbon black could be more completely dispersed throughout the composition, thus producing discs of more uniform conductivity and surface characteristics. Using the preferred base resin and carbon black, resistivities of less than 1 ohm-cm (D.C.) can be attained.

However, other extra-conductive carbon blacks of high surface area and pore volume can be used, in whole or in part, provided the required maximum resistivity can be attained by dispersing said black in a polymer base resin. An example of such a carbon black is Ketjenblack EC, manufactured by Akzo Chemie, disclosed in U.S. Pat. No. 4,228,050, at column 3.

It is known that the resistivity of plastic or rubber compositions filled with conductive carbon blacks in a given particle size range is minimized by low density of the particles, high "structure", or both. Resistivity is also minimized by reducing particle size, which has the effect of reducing the gaps between particles or aggregates. Thus, particle size, structure and density can be considered in choosing carbon blacks to minimize the resistivity of a conductive composition. In selecting carbon black for the compositions of this invention, no single property is critical to achieving the required level of resistivity, provided that independent requirements such as maximum particle size for homogeneous surface properties are met.

Thus, the particle size of the conductive carbon black particles useful herein is not critical and various particle sizes or mixtures of particle sizes can be employed, provided the conductive particles are not so large that they would form a grainy surface in the plastic matrix which would interfere with the signal patterns in the discs. In general, the particle size should be less than about 500 Angstroms.

The amount of carbon black added depends on the electrical properties required. The more conductive particles added, the more conductive the composition will become, but large quantities of fillers such as carbon black decrease the processability of the molding composition and increase the brittleness of the product. That amount of conductive particles must be added for the present application to reduce the resistivity to below 500 ohm-cm at 900 megaHertz, preferably to below 100 ohm-cm and, most preferably, to below about 60 ohm-cm. XE-2 or Ketjenblack EC carbon blacks can be added in amounts of from about 10 to about 25 weight percent, at present preferably about 20 weight percent, of the molding composition to achieve the desired conductivity. Other carbon blacks, which are denser materials, must be employed at higher loadings, up to 30 weight percent, to achieve comparable resistivities. Optimum compositions will contain the minimum loading of conductive particles that will give acceptable resistivity.

LUBRICANTS

Suitable lubricants for the polymeric resins of these molding compositions are well known and include fatty acids and esters of alcohols and fatty acids, polyfunctional acid and alcohol esters, soaps such as zinc, lead or calcium stearate and the like, fatty acid amides such as stearic amide, oleamide, ethylene bis-(stearamide) and the like. Presently preferred lubricants for the inventive compounds are silicone oils and alkyl esters of fatty acids. A more preferred lubricant is a silicone oil (fluid) having a viscosity at 25 degrees Centigrade ranging from about 10 to about 100,000 centistokes as expressed generically by the structure below. For example, the fluid can be a methylalkylsilicone, a methylphenylsilicone, a dimethylsilicone, etc.

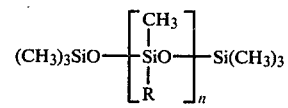

n = an integer

R = alkyl, aryl, alkaryl, etc. of 1 to about 12 carbon atoms

In a specific example the fluid can be a methylalkylsilicone having a viscosity of 50 centistokes and the formula above, with $n=7$ and $R=C_{10}H_{21}$. This oil is commercially available as SF-1147 of the General Electric Company.

Such fluids can be prepared as described in the Kirk-Othmer Encyclopedia of Chemical Technology, 2nd Edition, Vol. 18, pages 224, 237-241, John Wiley & Sons, Inc. 1969.

To be effective, lubricants used for the inventive compositions should be partially immiscible with the base polymer, so that said lubricant gradually seeps or bleeds out of the surface of said composition during mixing, molding and use in the molded video discs. Efficient lubricants must be present in small quantity to prevent high shear heating during processing and to provide good release of the molded discs or other articles from the mold. Lubricants also reduce frictional wear due to stylus contact, and increase capacitance between the stylus and the conductive disc, but should form a uniform film of much less than 0.3 micrometers thickness to preclude any interference with the stylus-disc interface. In addition to blending in the composition, lubricants comprising silicone oils can be applied to the surface of the disc. In contrast to the molding compositions of the prior art, e.g., U.S. Pat. No. 4,228,050, a single lubricant is generally sufficient to meet these requirements in the inventive compositions, when used in quantities ranging from about 1 to about 5 weight percent.

OTHER ADDITIVES

Where necessary to obtain the desired surface hardness of video discs molded of the inventive compositions, a resinous copolymer of styrene and acrylonitrile or styrene and methyl methacrylate can be added in proportions of up to 20 weight percent of the resin component. Where an elastomeric polymer has been included to enhance flexibility or toughness, this "surface hardener" tends to offset the softening effect of said elastomeric polymer, improving the hardness properties of said molding compositions for use in video discs.

Other resinous copolymers compatible with the resin component, comprising copolymers of ethylene and vinyl acetate, when used, can be added in proportions of from about 5 to 30 weight percent of the resin component to increase toughness and resistance to wear.

Stabilizers are generally not required in addition to those contained in the preferred base resins of K-Resins ®. When used, stabilizers which can be used comprise hindered phenols such as di-n-octadecyl(3,5-di-t-butyl-4-hydroxybenzyl) phosphonate; 2,6-di-t-butyl-4-methylphenol; tris(3,5-di-t-butyl-4-hydroxybenzyl) isocyanurate and the like, hindered amines such as di(2,2,6,6-tetramethyl-4-piperidyl) sebacate and the like, and mixtures thereof.

PREFERRED COMPOSITIONS

Preferred compositions can be prepared from ingredients in the proportions tabulated below in terms of weight percent of said compositions:

|  | Generally Employed Ranges (weight percent) | Preferred Ranges (weight percent) |
| --- | --- | --- |
| Resinous copolymer | at least 55 | about 60–78 |
| Elastomeric copolymer | about 0–15 | about 5–15 |
| Carbon black, extra-conductive | about 12–25 | about 15–25 |
| Lubricant | about 1–5 | about 1–3 |

Preferably, the composition consists essentially of the above ingredients.

In contrast to the known compositions based upon PVC, which relied upon multiple additives which had to be kept within narrow limits, the inventive compositions meet the critera for processing and the specifications for products such as pressed video discs without requiring such multiple additives or critical controls. In fact, production of the inventive molding compositions with reduced total additive levels results in molded articles of superior properties, e.g., reduced cost, greater homogeneity of surface, less "bleeding" or separation of additives, greater stability of composition, reduced weight, greater dimensional stability (up to 50–70 degrees Centigrade), flexibility and greater conductivity per unit weight loading of carbon black.

Discs molded of the inventive compositions generally require some lubricant content for best wear resistance, at least under such severe tests as the ten minute fixed picture test imposed by Japan Victor Corp. for their grooveless video discs.

The present molding compositions can be prepared by dry blending followed by continuous extrusion compounding, by continuous extrusion compounding alone, or by use of an internal mixer. The filled molding compositions can be pelletized for later melting and molding. Very thorough mixing is required to obtain optimum dispersion of the carbon black and other ingredients throughout the composition. Agglomeration of the carbon black particles would reduce conductivity and have adverse effects on the physical properties of the filled composition.

Molded articles, particularly video discs, can be made from the compositions of this invention by compression molding in conventional manner, e.g., forming a preform, compression molding at about 100 tons force using a 30–60 second cycle at with forming temperatures ranging from just above the softening point of the compositions up to about 200 degrees Centigrade, cooling the molded disc to attain form stability, e.g. 100 degrees Centigrade, removing the disc from the mold and removing flash, if any. It is presently believed that recording discs can be made by injection molding from the compositions of this invention; but compression molding processes are presently preferred when certain characteristics of said discs are to be optimized.

For video disc applications using a capacitance pickup scheme, a thin dielectric layer may be present between the surface of the disc and the electrode portion of the stylus. Said dielectric layer can be provided by a thin film of the polymer components of the molding composition around each conductive particle, and/or by the addition of sufficient lubricant to the molding composition so that bleeding of lubricant to the surface forms a thin film thereon. Such a lubricant film can also be formed by the application of silicone oil to the disc surface. The air gap between said electrode and the surface of the disc can also be utilized to form part of the required capacitance. Such capacitance pickup systems can use either a spiral grooved track (e.g., the RCA system; see U.S. Pat. No. 4,151,132) or a grooveless disc with tracking signals imprinted alongside the main signal, which is recorded spirally upon the surface of the disc.

The invention will be further illustrated by the following examples, but it is to be understood that the invention is not meant to be limited to the details described herein. In these examples parts and percentages are by weight.

EXAMPLE 1

A series of compositions was prepared from several commercially available, normally solid, resinous styrene-butadiene block copolymers, extra-conductive carbon black and when used, one of a lubricant selected from butyl stearate or a commercially available silicone oil. Generally, the compositions, each sample weighing about 1.2 kilograms, were prepared by mixing them in a Banbury mixer at a maximum temperature of about 190 degrees Centigrade employing about a 10 minute cycle. The compounded products were recovered and granulated as known in the art.

Blank discs measuring about 8 inches in diameter (202 millimeters) and about 1/16 inch (1.62 millimeters) in thickness were prepared from each granulated product by employing a reciprocating screw (30 millimeters diameter) injection molding machine having a shot size of about 50–60 grams. Each disc, placed on a flat surface, was evaluated for flatness (warpage) by visual inspection. It is believed that larger discs, e.g. about 12 inches (305 millimeters) in diameter or larger, can be formed by employing larger size injection molding machines, some of which are capable of shot sizes of about 200 ounces (5.7 kilograms), or larger.

Resistivity of each disc, and in some instances compression molded plaques formed from the compositions, in terms of ohm-cm (D.C.) was determined in accordance with the 4 point method. This method comprises the application of a small voltage difference at the ends of the test specimen and the measurement of resistivity between two points situated in between, to avoid any influence of contact resistances.

Polymers employed in the compositions:

Resin A is commercially sold as KR01 ® by Phillips Petroleum Company, Bartlesville, OK. The resin is styrene. It has a melt flow of about 0.8 grams/10 minutes as determined at 180 degrees Centigrade in accordance with ASTM D1238, 5 kg weight. Its preparation is disclosed in U.S. Pat. No. 3,639,521, particularly Example II, and it is sold as Solprene ® 416 by Phillips Petroleum Company. The results are given in Table 1.

TABLE 1

Styrene-Butadiene Block Copolymer Compositions
Resistivity and Warpage Results

| Run No. | Resin Type | Parts by Weight | Parts by Weight | | | Resistivity, Ohm-cm | | | |
|---|---|---|---|---|---|---|---|---|---|
| | | | Carbon Black (a) | Silicone Oil | Butyl Stearate | Compression Molded Plaque | Injection Molded Across Warpage | | |
| | | | | | | | Flow (b) | Flow (b) | Noted |
| 1 | A | 83 | 17 | 0 | 0 | 2.05 | 2.9 | 3.0 | yes |
| 2 | A | 82 | 17 | 1 | 0 | 2.16 | 3.3 | 3.3 | yes |
| 3 | A | 81.5 | 17 | 1.5 | 0 | 2.97 | 4.4 | 4.4 | yes |
| 4 | B | 76.5 | 22 | 1.5 | 0 | 1.04 | 1.4 | 1.3 | no |
| 5 | B | 73.5 | 25 | 1.5 | 0 | 0.64 | (d) | (d) | (d) |
| 6 | B | 83 | 17 | 0 | 0 | 2.67 | 5.2 | 5.2 | no |
| 7 | B-M (c) | 73–10 | 17 | 0 | 0 | 2.71 | 4.1 | 3.0 | no |
| 8 | A | 82.8 | 17 | 0 | 0.2 | not measured | 3.7 | 3.5 | yes |
| 9 | A | 82.5 | 17 | 0 | 0.5 | " | 3.2 | 3.3 | slight |
| 10 | A | 81 | 17 | 0 | 2 | " | 3.0 | 3.0 | slight |
| 11 | A | 79.3 | 20 | 0 | 0.7 | " | 1.3 | 1.3 | no |
| 12 | A | 79.3 | 20 | 0 | 0.7 | " | 1.3 | 1.3 | no |

(a) Extra-conductive carbon black XE-2, Phillips Petroleum Co.
(b) Flow means resistivity measured according to direction of flow of polymer into mold. Across flow means resistivity measured at right angles to polymer flow.
(c) Composition also contains 10 parts by weight Solprene ® 416, Phillips Petroleum Co., Bartlesville, OK, as an impact modifier M, as previously described.
(d) Not determined, degradation of discs.

disclosed in U.S. Pat. No. 4,091,053 as a block copolymer containing about 76 weight percent polymerized styrene and about 24 weight percent polymerized butadiene. The copolymer has a melt flow of about 8 grams/10 minutes as determined in accordance with ASTM D1238, condition G at 200 degrees Centigrade, a tensile strength of about 4000 psi (27.6 MPa) as determined in accordance with ASTM D638 and a Shore D hardness of about 75 as determined in accordance with ASTM D2240.

Resin B is commercially sold as KR04 ® by Phillips Petroleum Company and its manner of preparation is disclosed in U.S. Pat. No. 3,639,517, Example I, as a polymodal branched block copolymer containing the same ratio of polymerized styrene and butadiene as KR01. It is also described in U.S. Pat. No. 4,091,053 as the control resin. KR04 has a melt flow of about 6 grams/10 minutes, a tensile strength of about 3500 psi (24.1 MPa) and a Shore D hardness of about 72. It contains about 0.3 weight percent microcrystalline wax based on the weight of copolymer alone as an antiblocking agent.

The manner of preparation of resins A and B leads to the somewhat different physical properties noted above and it is also reflected in the somewhat different molecular weight distributions noted in the polystyrene segments as disclosed in U.S. Pat. No. 4,091,053. Resin A, as a result, has a somewhat narrower molecular weight distribution than resin B.

Both resin A and resin B are currently stabilized with about 1.5 parts by weight per 100 parts by weight monomers of trisnonylphenyl phosphite and about 0.5 parts by weight per 100 parts by weight monomers of octadecyl[3-(3,5-di-t-butyl-4-hydroxyphenyl)] propionate (Irganox ® 1076).

Modifying elastomer M is a butadiene-styrene block copolymer containing about 70 weight percent polymerized butadiene and 30 weight percent polymerized Inspection of the results shows that at similar carbon black loadings, compositions made with polymers KR01 and KR04 are about equivalent in resistivity performance. As expected, as the carbon black loading increases from about 15 to 25 weight percent, the resistivity decreases. Run 5 indicates that the composition containing 25 weight percent carbon black is not suitable for injection molding since the composition degraded while being injected into the mold, possibly due to poor flow properties resulting from the high level of carbon black.

The resistivity values obtained for the injection molded discs in the flow and across flow direction indicates that flow behavior with its attendant orientation will not present any serious problems since the resistivity measurements are essentially isotropic.

The warpage results indicate that discs having acceptable resistivity behavior can also exhibit little or no warpage. These results suggest that video discs can be fabricated by injection molding techniques when the carbon black level ranges from about 15 weight percent to about 22 weight percent based on the warpage, resistivity and flow behavior of the compositions. At least than about 15 weight percent the resistivity values may be too high for optimum use in video discs, e.g., greater than about 4 ohm-cm, and warpage may be unacceptable. At greater than about 22 weight percent carbon black loading, flow becomes difficult and degradation of the composition appears to be taking place during injection of the melt into the mold. However, such compositions can be pressed into acceptable quality video discs by the general commercial practice of compression molding.

The good results noted in run 7, in which the polymer phase consists of 73 parts by weight resinous copolymer and 10 parts by weight elastomeric copolymer, indicate that such polymer blends can be employed in producing video discs. The results further suggest that the admixture of a minor amount of a suitable polymer or polymers with the resinous base polymer may provide a means to optimize and/or adjust the physical properties desired in discs molded from such compositions, e.g., hardness, stiffness, resilience, etc.

Compositions of this invention have been compression molded into video discs which, when tested, display excellent properties. Discs molded of compositions such as run numbers 1 and 7 of Example I showed wear in a ten minute constant picture test, requiring repeated retracing of the same track by the stylus.

We claim:
1. A conductive molding composition comprising
   (a) from about 65 to 85 weight percent of a resin component selected from the group consisting of
      (1) a normally solid, resinous block copolymer of a monovinyl-substituted aromatic hydrocarbon containing from 8 to 12 carbon atoms per molecule and a minor amount of at least one conjugated alkadiene containing from 4 to 8 carbon atoms per molecule, and one or more optional modifying polymers selected from the group consisting of
         (A) a normally solid resinous homopolymer of a monovinyl-substituted aromatic hydrocarbon, and
         (B) a normally solid, elastomeric copolymer of a major amount of at least one conjugated alkadiene containing from 4 to 8 carbon atoms per molecule and a minor amount of a monovinyl-substituted aromatic hydrocarbon containing from 8 to 12 carbon atoms per molecule and,
      (2) a normally solid, resinous homopolymer of a monovinyl-substituted aromatic hydrocarbon and one or more modifying polymers selected from the group consisting of
         (A) elastomeric copolymers, as defined above, and
         (B) normally solid resinous block copolymers as defined above,
   (b) from about 10 to 30 weight percent of finely divided extra-conductive carbon black particles, and
   (c) from about 1 to 5 weight percent of at least one lubricant,
wherein said carbon black and lubricant are uniformly dispersed within said composition.

2. A conductive molding composition comprising
   (a) from about 50 to 85 weight percent of a normally solid, resinous block copolymer of a conjugated alkadiene having 4 to 8 carbon atoms with a monovinyl-substituted arene having 8 to 12 carbon atoms,
   (b) from about 10–30 weight percent finely divided extra-conductive carbon black particles,
   (c) from 0 to about 15 weight percent of an elastomeric copolymer of a monovinyl-substituted arene of 8 to 12 carbon atoms per molecule with a conjugated alkadiene of 4 to 8 carbons per molecule, and
   (d) from about 1 to 5 weight percent of at least one lubricant,
wherein said carbon black and said lubricant are uniformly dispersed within the composition.

3. A composition in accordance with claims 1 or 2 wherein said carbon black has one or more of the following properties:
   apparent bulk density in the range of about 80–112 kilograms per cubic meter,
   nitrogen BET surface area in the range of 600 to 1200 square meters per gram,
   DBP absorption in the range of 300 to 450 mililiters per 100 grams, and
   pour density (ASTM D-1513) of less than 250 kilograms per cubic meter.

4. The composition in accordance with claims 1 or 2 comprising from about 15 to about 22 weight percent of said extra-conductive carbon black.

5. A composition in accordance with claims 1 or 2 wherein the bulk resistivity of said composition is less than about 500 ohm-cm at 900 megaHertz.

6. A composition in accordance with claims 1 or 2 wherein the bulk resistivity of said composition is less than about 100 ohm-cm at 900 megaHertz.

7. A composition in accordance with claims 1 or 2 wherein said bulk resistivity is less than about 3 ohm-cm under direct current measurement.

8. A composition in accordance with claims 1 or 2 wherein said bulk resistivity is less than about 1 ohm-cm under direct current measurement.

9. A composition in accordance with claims 1 or 2 wherein the lubricants are selected from the group consisting of silicone oils and alkyl esters of fatty acids, and said lubricants are partially immiscible with said resin.

10. A composition in accordance with claims 1 or 2 wherein said resinous copolymer is selected from a group consisting of radial branched block copolymers of styrene and 1,3-butadiene with the proportion of polymerized styrene in the range of about 70 to about 80 weight percent and the proportion of polymerized butadiene in the range of 30 to about 20 weight percent.

11. A composition in accordance with claims 1 or 2 wherein said elastomeric copolymer comprises a radial butadiene/styrene block copolymer containing about 40 to 90 weight percent polymerized butadiene and about 60 to 10 weight percent polymerized styrene.

12. A composition in accordance with claims 1 or 2 wherein said normally solid, resinous block copolymers comprise about 70 to 80 weight percent of units derived from said monovinyl aromatic hydrocarbon and about 30 to 20 weight percent of units derived from said conjugated diene, and said elastomeric copolymers comprise from about 60 to 90 weight percent of units derived from said conjugated alkadiene and from about 40 to 10 weight percent of units derived from said monovinyl aromatic hydrocarbon, which copolymer can be random or block (diblock or radial) in nature.

13. A video disc, with an information track, molded from the conductive molding composition defined in claim 1 or 2 and having a bulk resistivity of below about 500 ohm-cm at 900 megaHertz.

14. A video disc in accordance with claim 13, wherein said bulk resistivity is below about 100 ohm-cm at 900 megaHertz.

15. In a video disc, adapted for use with a playback stylus to effect recovery of signals occupying a band width of at least several megaHertz when relative motion at a desired rate is established between said disc and said stylus, said disc consisting of a molding composition containing finely divided conductive particles of carbon black and having a bulk resistivity below about 500 ohm-cm at 900 megaHertz, said disc having information stored in an information track, said information being recoverable in the form of signals of said band width upon establishment of said motion at said rate, the improvement comprising the molding of said disc from a conductive molding composition comprising:

(a) from about 50 to 85 weight percent of a resinous copolymer of a conjugated alkadiene having 4 to 8 carbon atoms with a monovinyl-substituted arene having 8 to 12 carbon atoms, (b) from about 10 to 30 weight percent finely divided extra-conductive carbon black particles, (c) from 0 to about 15 weight percent of an elastomeric copolymer of a monovinyl-substituted arene of 8 to 12 carbon atoms per molecule with a conjugated alkadiene of 4 to 8 carbons per molecule, and (d) from about 1 to 5 weight percent of at least one lubricant, wherein said carbon black and said lubricant are uniformly dispersed within said composition.

16. A video disc in accordance with claim 15 wherein the bulk resistivity of said disc is below 100 ohm-cm at 900 megaHertz.

17. A disc in accordance with claim 13 wherein said information track is a spiral groove dimensioned for reception therein of said playback stylus.

18. A disc in accordance with claim 13 wherein said information track is a signal recorded spirally upon an essentially smooth, grooveless surface and wherein said disc comprises tracking means comprising tracking signals in said disc surface by which said stylus is positioned over said information track.

19. A process for producing a video disc in accordance with claim 17 which process comprises molding said disc from said conductive molding composition.

20. A process in accordance with claim 19, comprising compression molding said disc.

21. A process in accordance with claim 19 comprising injection molding said disc.

22. A video disc with an information track, molded from the conductive molding composition defined in claim 1 or 2 and having a bulk resistivity of below about 500 ohm-cm at 900 megaHertz, wherein the lubricants are selected from the group consisting of silicone oils and alkyl esters of fatty acids, wherein said lubricants are partially immiscible with said resin.

23. A video disc with an information track, molded from the conductive molding composition defined in claim 1 or 2 and having a bulk resistivity of below about 500 ohm-cm at 900 megaHertz, wherein said resinous copolymer is selected from the group consisting of radial branched block copolymers of styrene and 1,3-butadiene with the proportion of polymerized styrene in the range of from about 70 to about 80 weight percent and the proportion of polymerized butadiene in the range of from about 30 to about 20 weight percent.

24. A video disc with an information track, molded from the conductive molding composition defined in claim 1 or 2 and having a bulk resistivity of below about 500 ohm-cm at 900 megaHertz, wherein said elastomeric copolymer comprises a radial butadiene/styrene block copolymer containing from about 40 to about 90 weight percent polymerized butadiene and from about 60 to about 10 weight percent polymerized styrene.

25. A video disc with an information track, molded from the conductive molding composition defined in claim 1 or 2 and having a bulk resistivity of below about 500 ohm-cm at 900 megaHertz, wherein said normally solid, resinous block copolymers comprise from about 70 to about 80 weight percent of units derived from said monovinyl aromatic hydrocarbon and from about 30 to about 20 weight percent of units derived from said conjugated diene, and said elastomeric copolymers comprise from about 60 to about 90 weight percent of units derived from said conjugated alkadiene and from about 40 to about 10 weight percent of units derived from said monovinyl aromatic hydrocarbon, which copolymer can be random or block (diblock or radial) in nature.

26. A disc in accordance with claim 15 wherein said information track is a spiral groove dimensioned for reception therein of said playback stylus.

27. A disc in accordance with claim 15 wherein said information track is a signal recorded spirally upon an essentially smooth, grooveless surface and wherein said disc comprises tracking means comprising tracking signals in said disc surface by which said stylus is positioned over said information track.

28. A process for producing a video disc in accordance with claim 18, which process comprising molding said disc from said conductive molding composition.

29. A process for producing a video disc in accordance with claim 26, which process comprises molding said disc from said conductive molding composition.

30. A process for producing a video disc in accordance with claim 27, which process comprises molding said disc from said conductive molding composition.

31. A process in accordance with claim 28, comprising compression molding said disc.

32. A process in accordance with claim 26, comprising compression molding said disc.

33. A process in accordance with claim 27, comprising compression molding said disc.

34. A conductive molding composition in accordance with claim 1 or 2, further comprising as 0 to 20 weight percent of the resin component a resinous copolymer of styrene with acrylonitrile or methyl methacrylate.

35. A conductive molding composition in accordance with claim 1 or 2, further comprising as a portion of the resin component a copolymer of ethylene and vinyl acetate.

36. A conductive molding composition in accordance with claim 35, wherein said copolymer of ethylene and vinyl acetate is in the range from about 5 to about 30 weight percent of said resin component.

37. A video disc in accordance with claim 13, wherein said molding composition further comprises as 0 to 20 weight percent of the resin component a resinous copolymer of styrene with acrylonitrile or methyl methacrylate.

38. A video disc in accordance with claim 13, wherein said molding composition further comprises as a portion of the resin component a copolymer of ethylene and vinyl acetate.

39. A video disc in accordance with claim 38, wherein said copolymer of ethylene and vinyl acetate is in the range from about 5 to about 30 weight percent of said resin component.

40. A video disc, with an information track, molded from the conductive molding composition defined in claim 3 and having a bulk resistivity of below about 500 ohm-cm at 900 megaHertz.

41. A video disc in accordance with claim 40, wherein said bulk resistivity is below about 100 ohm-cm at 900 megaHertz.

42. A disc in accordance with claim 40 wherein said information track is a spiral groove dimensioned for reception therein of said playback stylus.

43. A disc in accordance with claim 40 wherein said information track is a signal recorded spirally upon an essentially smooth, grooveless surface and wherein said disc comprises tracking means comprising tracking signals in said disc surface by which said stylus is positioned over said information track.

44. A process for producing a video disc in accordance with claim 42 which process comprises molding said disc from said conductive molding composition.

45. A process in accordance with claim 44, comprising compression molding said disc.

46. A process in accordance with claim 44 comprising injection molding said disc.

47. A process in accordance with claim 28 comprising injection molding said disc.

48. A process in accordance with claim 1 comprising injection molding said disc.

49. A video disc with an information track, molded from the conductive composition defined in claim 3 and having a bulk resistivity of below about 500 ohm-cm at 900 megaHertz, wherein the lubricants are selected from the group consisting of silicone oils and alkyl esters of fatty acids, wherein said lubricants are partially immiscible with said resin.

50. A video disc with an information track, molded from the conductive molding composition defined in claim 3 and having a bulk resistivity of below about 500 ohm-cm at 900 megaHertz, wherein said resinous copolymer is selected from the group consisting of radial branched block copolymers of styrene and 1,3-butadiene with the proportion of polymerized styrene in the range of from about 70 to about 80 weight percent and the proportion of polymerized butadiene in the range of from about 30 to about 20 weight percent.

51. A video disc with an information track, molded from the conductive molding composition defined in claim 3 and having a bulk resistivity of below about 500 ohm-cm at 900 megaHertz, wherein said elastomeric copolymer comprises a radial butadiene/styrene block copolymer containing from about 40 to about 90 weight percent polymerized butadiene and from about 60 to about 10 weight percent polymerized styrene.

52. A video disc with an information track, molded from the conductive molding composition defined in claim 3 and having a bulk resistivity of below about 500 ohm-cm at 900 megaHertz, wherein said normally solid, resinous block copolymers comprise from about 70 to about 80 weight percent of units derived from said monovinyl aromatic hydrocarbon and from about 30 to about 20 weight percent of units derived from said conjugated diene, and said elastomeric copolymers comprise from about 60 to about 90 weight percent of units derived from said conjugated alkadiene and from about 40 to about 10 weight percent of units derived from said monovinyl aromatic hydrocarbon, which copolymer can be random or block (diblock or radial) in nature.

53. A process for producing a video disc in accordance with claim 43, which process comprising molding said disc from said conductive molding composition.

54. A process in accordance with claim 54, comprising compression molding said disc.

55. A video disc in accordance with claim 40, wherein said molding composition further comprises as 0 to 20 weight percent of the resin component a resinous copolymer of styrene with acrylonitrile or methyl methacrylate.

56. A video disc in accordance with claim 40, wherein said molding composition further comprises as a portion of the resin component a copolymer of ethylene and vinyl acetate.

57. A video disc in accordance with claim 56, wherein said copolymer of ethylene and vinyl acetate is in the range from about 5 to about 30 weight percent of said resin component.

* * * * *